(12) United States Patent  
Tai et al.

(10) Patent No.: US 9,608,327 B1  
(45) Date of Patent: Mar. 28, 2017

(54) MAGNETICALLY BOOSTED NFC ANTENNA

(71) Applicant: Amazon Technologies, Inc., Reno, NV (US)

(72) Inventors: Seng Chin Tai, Rocklin, CA (US); Chun Kit Lai, Cupertino, CA (US); Adrian Napoles, Cupertino, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 268 days.

(21) Appl. No.: 14/312,716

(22) Filed: Jun. 24, 2014

(51) Int. Cl.
*H01Q 7/06* (2006.01)
*H01Q 1/24* (2006.01)

(52) U.S. Cl.
CPC ............... *H01Q 7/06* (2013.01); *H01Q 1/243* (2013.01)

(58) Field of Classification Search
CPC ................................. H01Q 7/06; H01Q 1/243
USPC .......................................... 343/706; 455/550
See application file for complete search history.

(56) References Cited

U.S. PATENT DOCUMENTS

| | | | | |
|---|---|---|---|---|
| 7,903,041 | B2 * | 3/2011 | LeVan ....................... | H01Q 7/00 343/700 MS |
| 2006/0019696 | A1 * | 1/2006 | Brunel .................... | H01Q 1/243 455/550.1 |
| 2012/0306714 | A1 * | 12/2012 | Yosui .................... | H01Q 1/2208 343/788 |

OTHER PUBLICATIONS

Roland, Near Field Communication (NFC) Technology and Measurements White Paper, Rohde & Schwarz, Jun. 2011.
Roland, Automatic Impedance Matching for 13.56 MHz NFC Antennas, 6th Symposium on Communication Systems, Networks and Digital Signal Processing, 2008.
Solutions for Today's Electronics, Electronics Materials Solutions Division, 3M, 2014.
Magnetic Core Characteristics, Section 2, Texas Instruments, 2001.
Antenna Design Guide, AN11019, CLRC663, MFRC630, MFRC631, SLRC610, NXP, Jul. 17, 2012.
Lee, Antenna Circuit Design for RFID Applications, AN710, Microchip Technology Inc., 2003.
RF Amplifier for NXP Contactless NFC Reader IC's, AN142522, NXP, Nov. 25, 2008.

* cited by examiner

*Primary Examiner* — Dameon E Levi
*Assistant Examiner* — Walter Davis
(74) *Attorney, Agent, or Firm* — Seyfarth Shaw LLP; Ilan N. Barzilay; Tyrus S. Cartwright

(57) ABSTRACT

The range of a Near Field Communications (NFC) in an electronic device is boosted by positioning a magnet near the center of a spiral loop NFC antenna. The magnet interacts with a modulated magnetic field generated by the antenna, concentrating the power of the modulated field. The magnet may be part of another component of the device, such as a magnet in the zoom mechanism of a camera. If the electronic device has a metal case, performance of the NFC antenna is further enhanced by including an opening through the metal over an axis of the magnet and a segment of the antenna's spiral loop, and by extending the opening to eliminate a parasitic current pathway around the antenna. The extended opening in the metal case significantly reduces the effect of eddy currents generated in the housing that counter the NFC magnetic field.

20 Claims, 15 Drawing Sheets

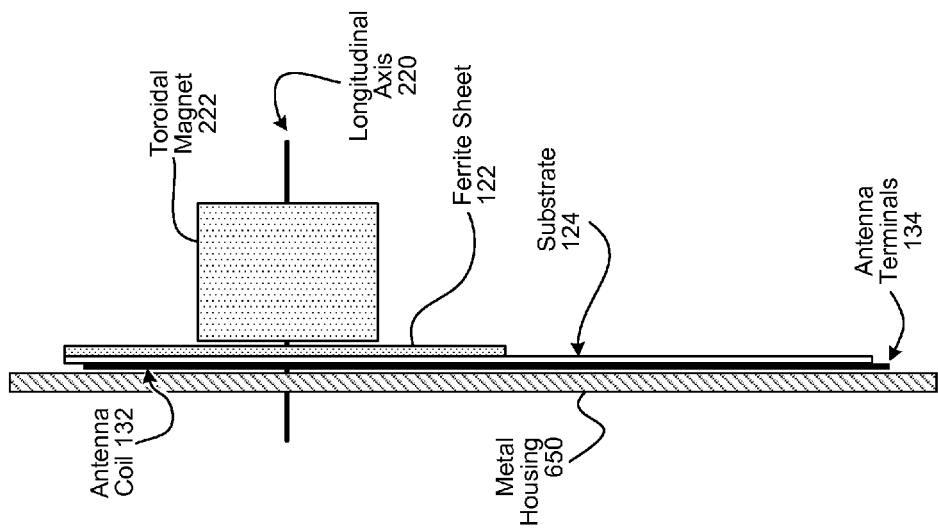
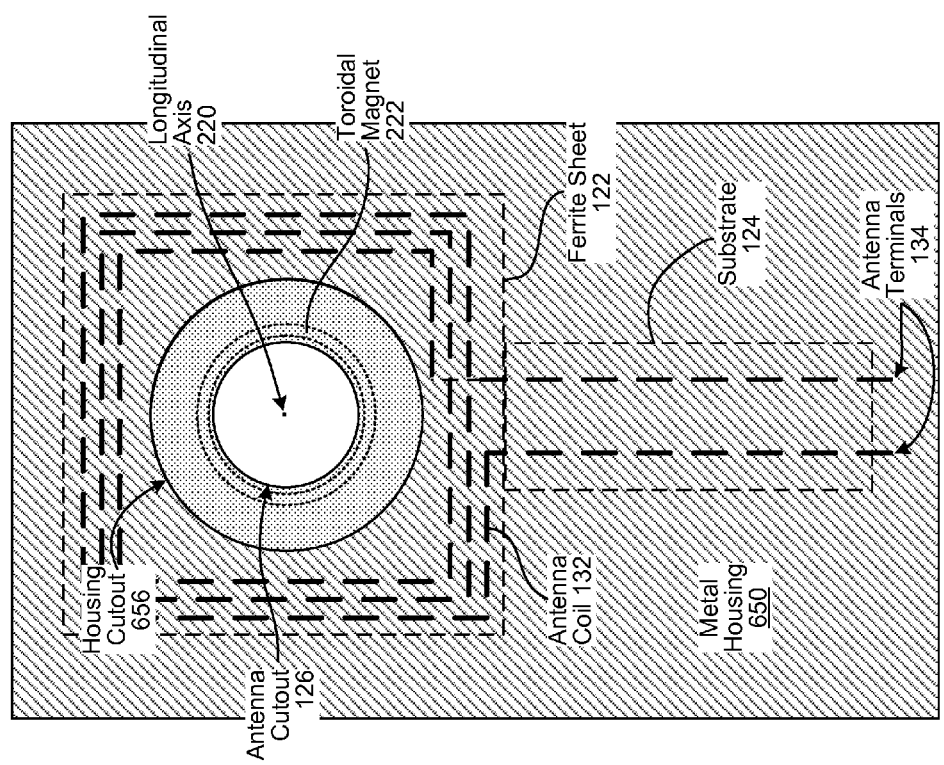

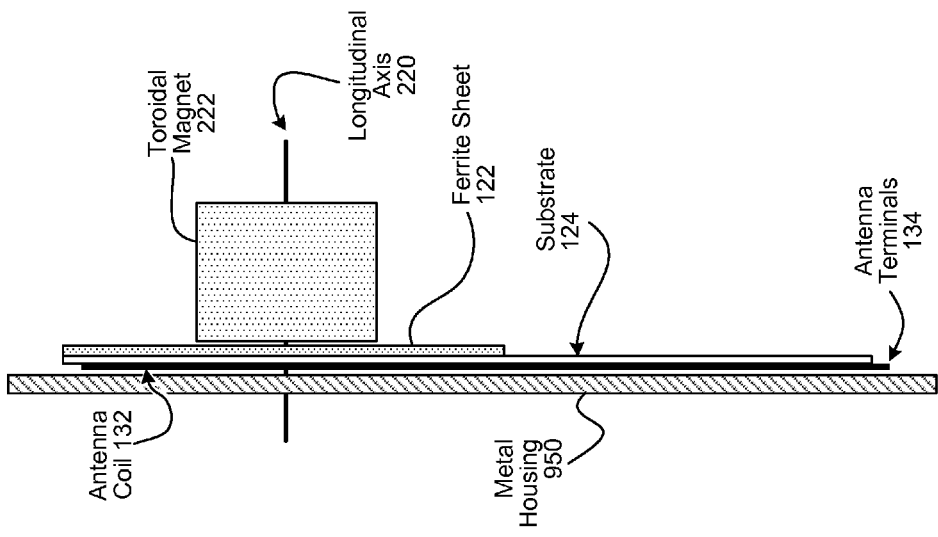
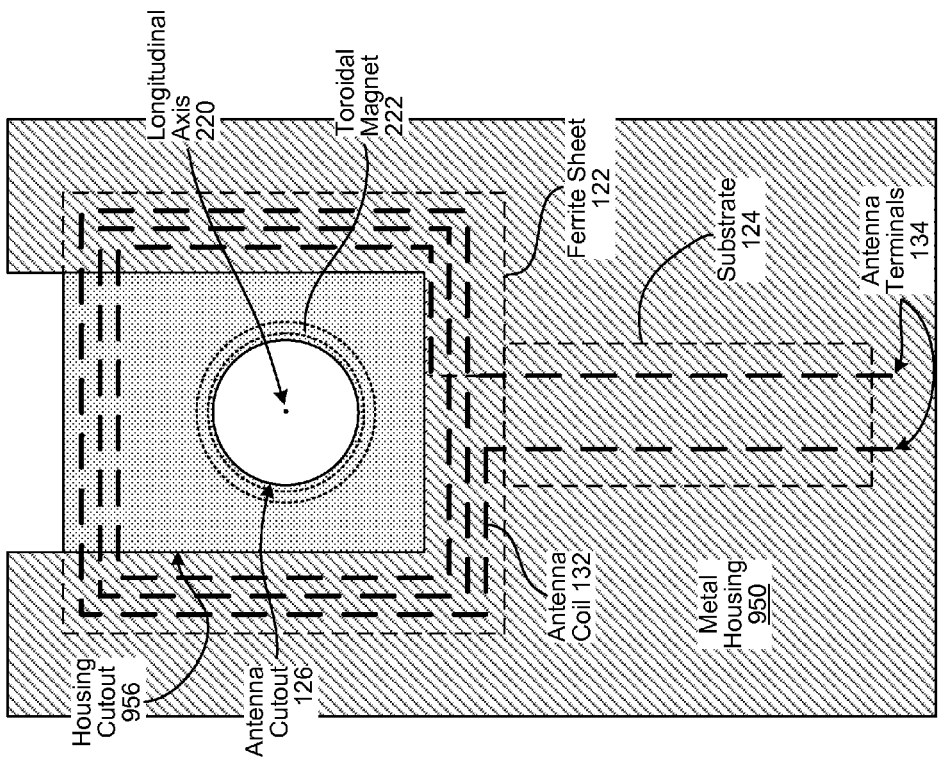

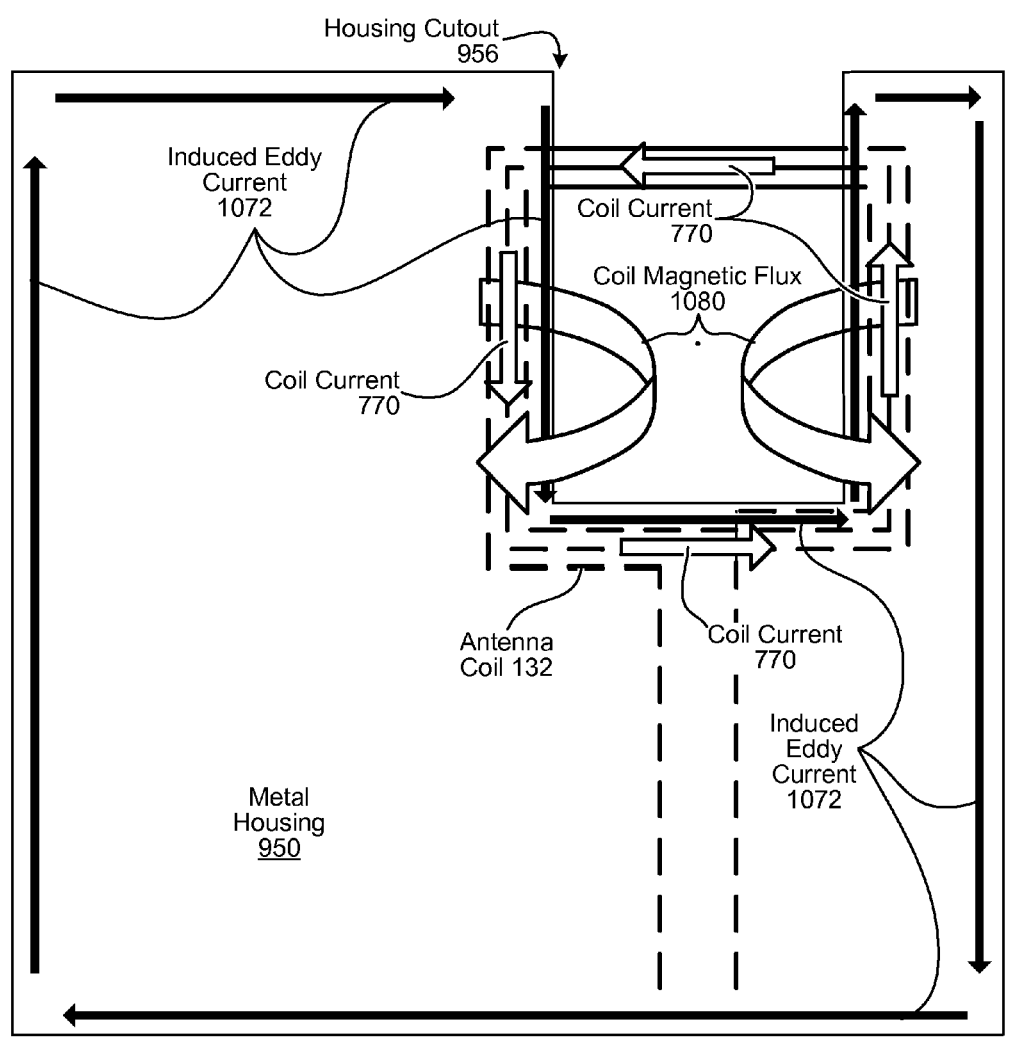

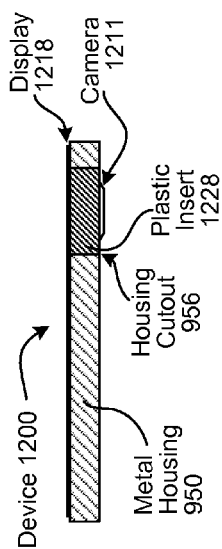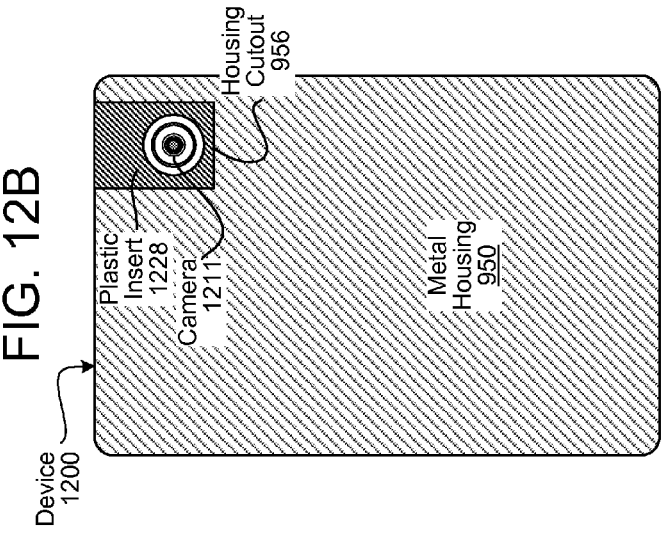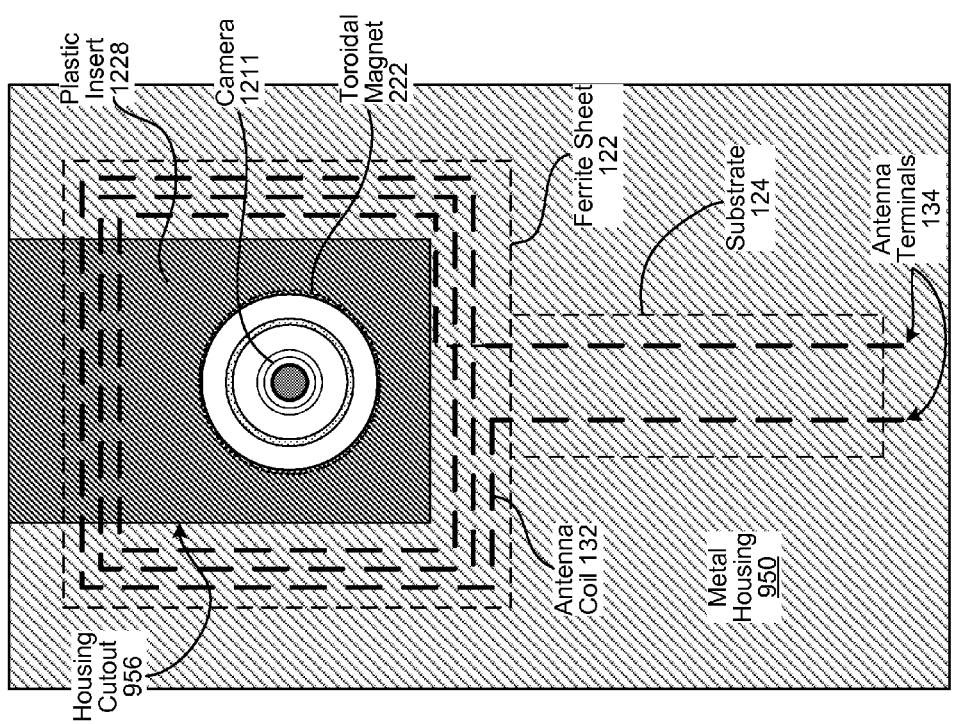

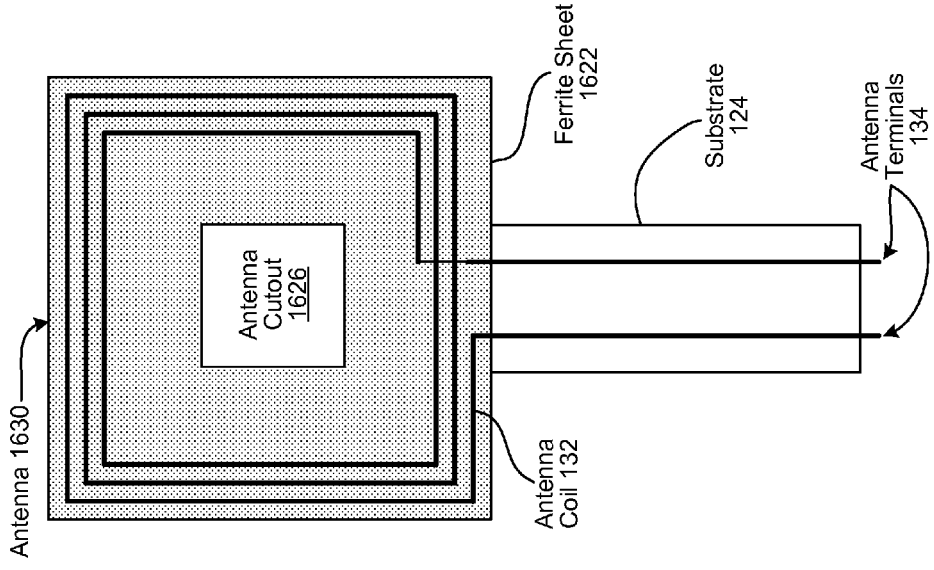
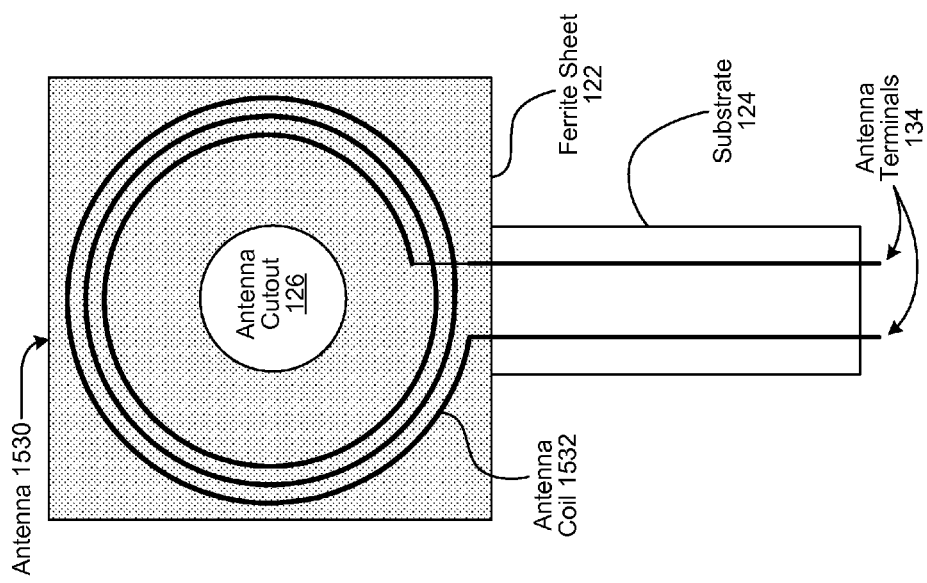

MAGNETICALLY BOOSTED NFC ANTENNA

BACKGROUND

There has been a proliferation of proximity-based technologies and standards to replace the magnetic stripe used by payment cards and security badges and other legacy technologies. The new technologies have introduced capabilities that have exceed those of the magnetic stripe, leading to the integration of proximity-based capabilities not only into smart cards and key fobs, but also into personal electronic devices such as cellular phones and tablet computers.

BRIEF DESCRIPTION OF DRAWINGS

For a more complete understanding of the present disclosure, reference is now made to the following description taken in conjunction with the accompanying drawings.

FIG. 6A illustrates a plan view for the magnetically boosted loop antenna arranged in a first conductive housing.

FIG. 6B illustrates a side view of the arrangement in FIG. 6A.

FIG. 9A illustrates a plan view for the magnetically boosted loop antenna arranged in a second conductive housing.

FIG. 9B illustrates a side view of the arrangement in FIG. 9A.

FIGS. 10 and 11 illustrate the interaction of magnetic flux from the antenna coil with the conductive housing from FIG. 9, illustrating how the housing cutout alters flow of induced eddy currents.

FIG. 12A illustrates a plan view of a section of a finished device based on FIG. 9A where the magnet is part of a camera zoom mechanism.

FIG. 12B illustrates a finished device based on the section illustrated in FIG. 12A, but without illustrating the underlying antenna/magnet structure.

FIG. 12C illustrates a top-down view of the finished device in FIG. 12B.

FIGS. 15 and 16 illustrate plan views for examples of other styles of inductive loop antennas that may be magnetically boosted.

The drawings are not drawn to scale and relative sizes between components may be different than illustrated, unless stated otherwise in the text.

DETAILED DESCRIPTION

Near Field Communication (NFC) is a short-range two-way wireless communication technology that uses magnetic-field induction to enable communications between electronic devices in close proximity. An NFC-capable device is configured with a coil-loop antenna, through which an electric current is passed to generate a magnetic field that surrounds the conductor forming the coil-loop. A change in the magnetic field in the vicinity of the antenna induces a change in voltage across the terminals of the coil-loop, and a change in voltage across the terminals of the coil-loop changes the magnetic field generated by the antenna. By modulating the magnetic field generated between the inductively-coupled coil-loop antennae, data is transferred between devices. There are many uses of NFC, including in contactless payment systems, similar to those used in credit cards and electronic ticket smartcards, but integrated into an electronic devices such as a cellular telephones and tablet computers.

Figure 1B:
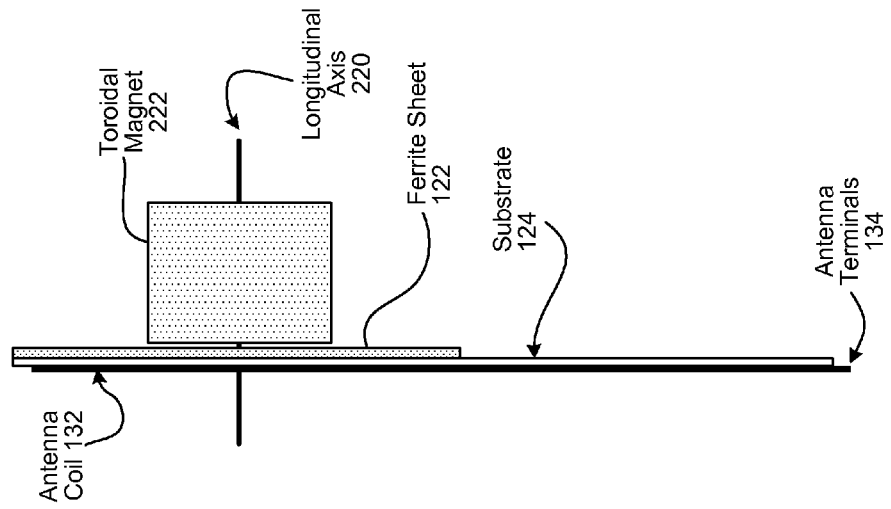
FIG. 1B illustrates a side view of the magnetically boosted loop antenna in FIG. 1A.
Figure 1A:
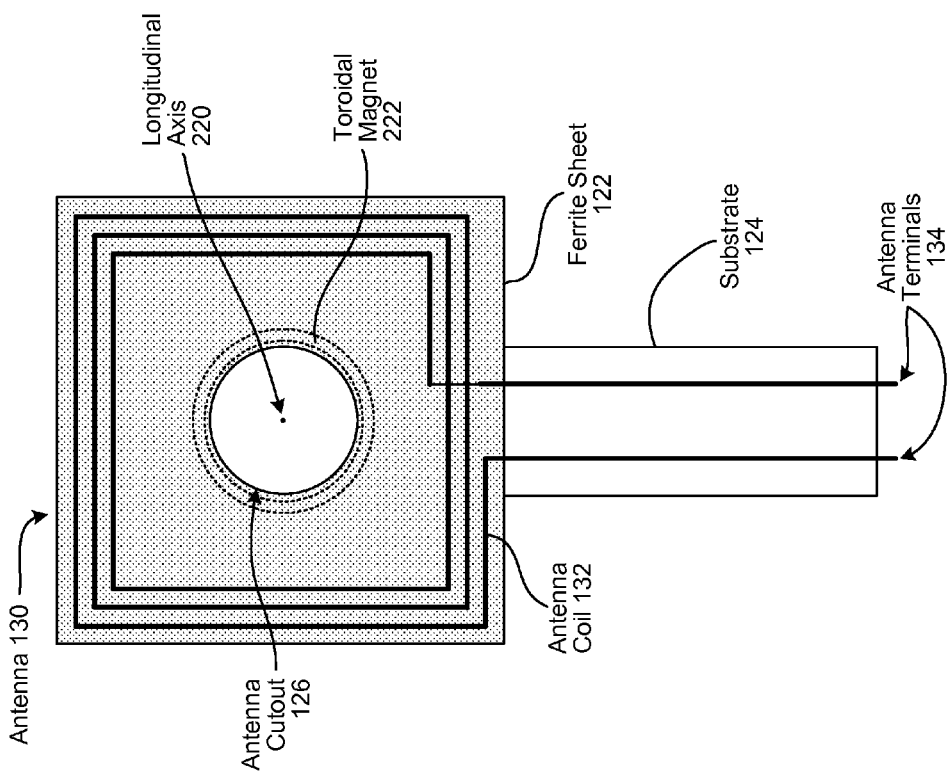
FIG. 1A illustrates a plan view for a magnetically boosted loop antenna.
Figure 3A:
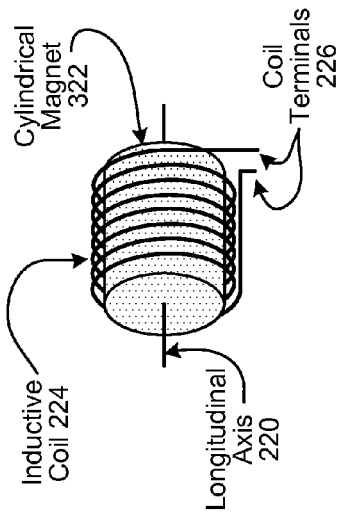
FIG. 3A illustrates a perspective view of a cylindrical magnet and coil.
Figure 3B:
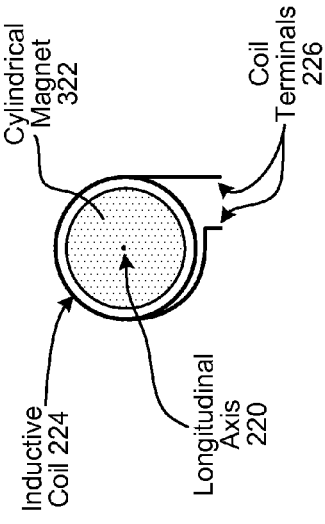
FIG. 3B illustrates a top-plan view of the cylindrical magnet and coil in FIG. 3A.

FIGS. 1A and 1B illustrate an arrangement of using a permanent magnet (222) to boost the range of an NFC antenna 130 by concentrating the magnetic field generated by the antenna 130, as the magnetic flux of the permanent magnet (222) passing through a cutout 126 in a ferrite sheet 122 combines with the magnetic field generated by the antenna 130, increasing the total effective flux along the longitudinal axis 220. A "permanent magnet" is an object made from a material that is magnetized and creates its own persistent magnetic field, as compared to an electromagnet that has no persistent field and becomes magnetized only when a charge is applied to it. As will be discussed further below, the antenna 130 may be positioned flush against the inner surface of a device's housing, or at least be proximate to the inner surface of the device's housing.

The antenna 130 comprises an electrically conductive coil-loop 132 disposed on an electrically non-conductive substrate 124. An "electrically conductive" material is a material that permits the flow of electrical current in one or more directions. For example, metals used for electrical wiring are electrically conductive. An "electrically non-conductive" material does not permit the flow of electrical current through the material. For example, electrical insulators through which electric charges do not flow freely and which have a high resistivity are electrically non-conductive.

The substrate 124 may be flexible to accommodate device assembly, and an electrically-insulating cover film (not illustrated) may overlay the coil 132 and substrate 124. A ferrite sheet 122, or similar flux-field directional material, such as a thin layer of ferromagnetic material, is situated behind the antenna coil 132 as a backing, placed between the antenna coil 132 and electronic, metallic, and other components located to the interior the device, thereby reducing the attenuation of the magnetic field emanating from the antenna coil 132 due to countercurrents induced in these other components. When a current is applied across the antenna terminals 134, a magnetic field extends outward from the antenna, relative to the ferrite sheet 122 and coil 132, in a direction of the longitudinal axis 220. The electrically non-conductive substrate 124 is interposed between (and may be adhesively bonded to) the coil-loop 132 and the ferrite sheet 122

There is a hole (antenna cutout 126) through the ferrite sheet 122 and substrate 124, centered in the middle of the coil 132. A magnet 222 is positioned proximate to (i.e., through or behind) the hole 126. The magnet 222 positioned behind the ferrite sheet 122, a perimeter of the hole 126 is smaller than an outside diameter of the magnet, such that the ferrite sheet 122 at least partially overlaps the proximate end of the magnet. This arrangement contributes to the interaction of the magnetic field of the magnet with that from the coil 132, as will be further demonstrated in connection with FIGS. 8 and 11. As illustrated in FIG. 1A with a toroid magnet 222, the hole 126 is smaller than the inside diameter/edge of the magnet, with the ferrite sheet 122 extending slightly beyond the magnet's inside perimeter. However, the hole 126 may instead be larger than and not overlap with the outer perimeter/edge of the magnet. Also, although the illustrated magnet is toroidal, other shapes may be used such as a cylindrical magnet.

The longitudinal axis 220 is the central axis of the toroid or cylinder of the permanent magnet, and is perpendicular to a plane of the ferrite sheet 122 and antenna coil 132. The antenna 130 is positioned relative to the magnet 222 so that the longitudinal axis 220 of the magnet corresponds generally to a center of the coil 132 and the center of the magnetic field to be generated by the coil 132. Also, the center of the antenna cutout 126 is generally coincident with the longitudinal axis 220. "Generally coincident" means occurring at a same approximate location. A first axis being "substantially collocated" with a second axis means that the axes are parallel (or close to parallel) and are generally coincident. For example, the longitudinal axis 220 and the center of the antenna cutout 126 being generally coincident means that the longitudinal axis 220 passes approximately through a center of the antenna cutout 126. Likewise, the longitudinal axis 220 being substantially collocated with a central axis of the coil means the two axes aligned and overlap, or are close to aligning/overlapping.

By aligning the permanent magnet with the center of the coil, the magnetic field/flux of the magnet 222 interacts with the magnetic field generated by the coil 132, increasing the density of the field extending outward along the longitudinal axis 220, thereby extending the magnetic field of the NFC antenna 130 outward and thereby boosting a range for the NFC communications. In essence, the permanent magnet focusses the direction of the modulated magnetic field generated by the coil 132.

The magnet used may be a stand-alone permanent magnet, but an advantage of the boosted antenna design is that common components found in electronic devices already include permanent magnets whose field may be utilized together with the NFC antenna 130 to boost performance. Examples of common components that contain such magnets include dynamic microphones, the zoom mechanism used with cameras, coil-based haptic effect generators, and moving-coil speakers, such as those that will be discussed below, although other components may include magnets as well.

Figure 2A:
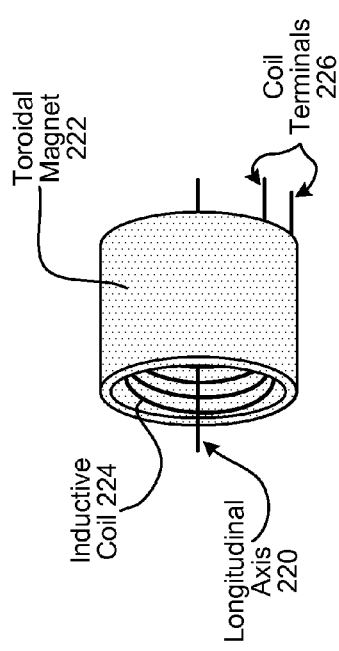
FIG. 2A illustrates a perspective view of a toroidal magnet and coil.
Figure 2B:
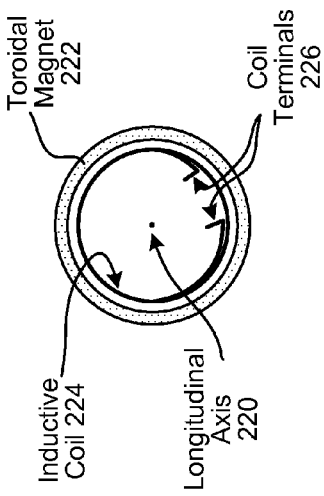
FIG. 2B illustrates a top-plan view of the toroidal magnet and coil in FIG. 2A.

Examples of the types of permanent magnets conventionally found in such components are illustrated in FIGS. 2A, 2B, 3A, and 3B. Toroidal magnets such as magnet 222 illustrated in FIGS. 2A and 2B are commonly included in camera zoom mechanism and moving-coil speakers. The toroid has a square or rectangular cross-section (rectangular as-illustrated). An inductive coil inside the toroid acts as an armature, moving forward or backward along the longitudinal axis 220 in accordance with changes in current applied to the coil terminals 226.

Cylindrical magnets such as magnet 322 are commonly included in coil-based haptic effect generators. In a haptic effect generator, the position of the inductive coil 224 may be fixed, with the cylindrical magnet moving along the longitudinal axis 220 to create the haptic vibration. Dynamic microphones may use either style of magnet, with the magnet in a fixed position and the coil 224 moving along the longitudinal axis 220 to convert audible vibration into electric current.

Figure 4B:
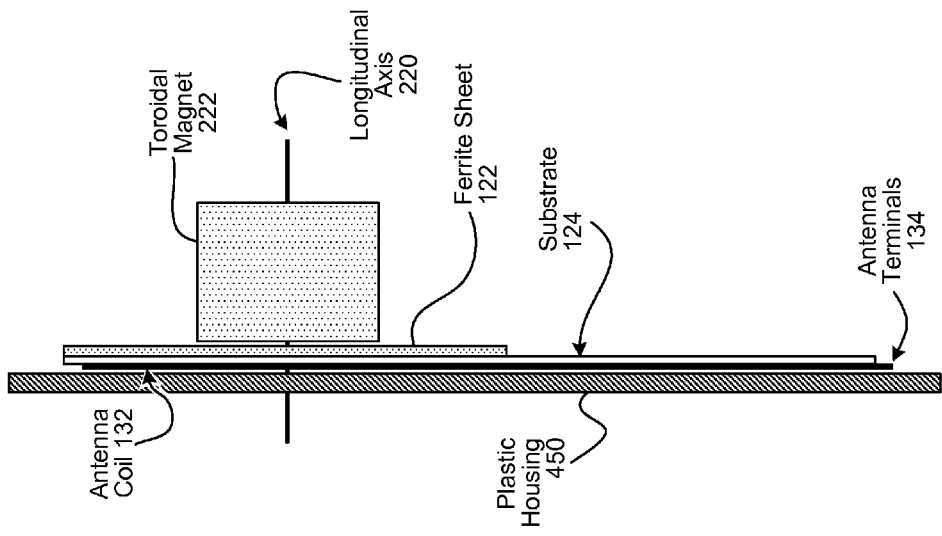
FIG. 4B illustrates a side view of the arrangement in FIG. 4A.
Figure 4A:
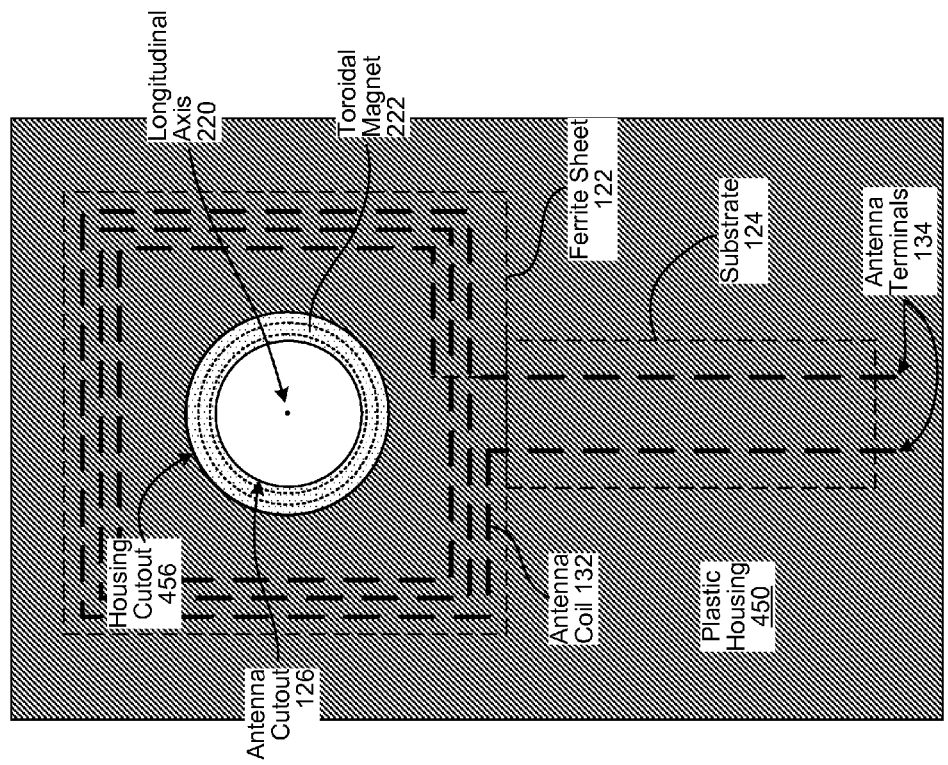
FIG. 4A illustrates a plan view for the magnetically boosted loop antenna arranged in a first non-conductive housing.

FIGS. 4A and 4B illustrate the antenna 130 and a magnet 222 arranged relative to a section of plastic housing 450 of a device. The dotted lines are included to demonstrate relative positions and denote that the feature is located behind the housing. The housing has a cutout 456 to accommodate the component including the magnet 222, such as a cutout for a camera or speaker. Since no induced eddy currents are generated in the electrically non-conductive material used for the housing in this example, the plastic housing 450 does not substantially dampen the magnetic field generated by the antenna, and the size and shape of the housing cutout do not appreciably affect antenna performance.

Figure 5B:
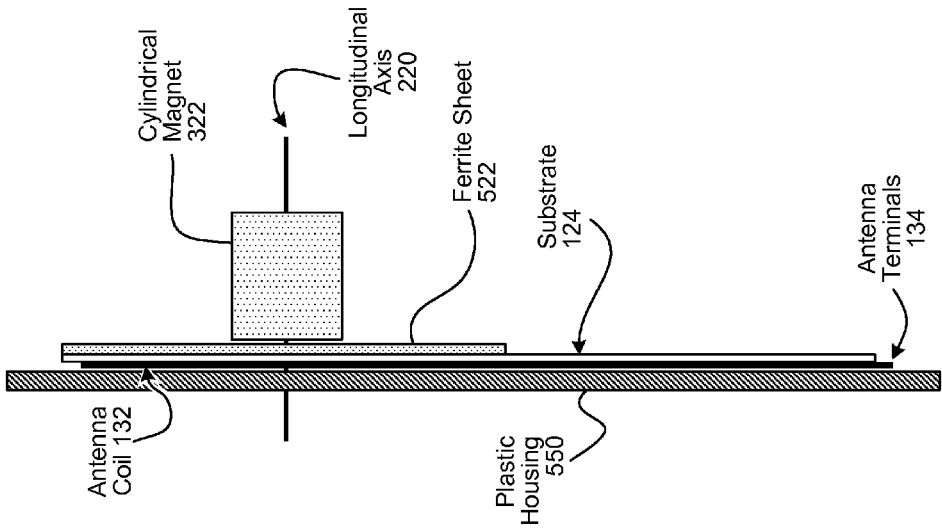
FIG. 5B illustrates a side view of the arrangement in FIG. 5A.
Figure 5A:
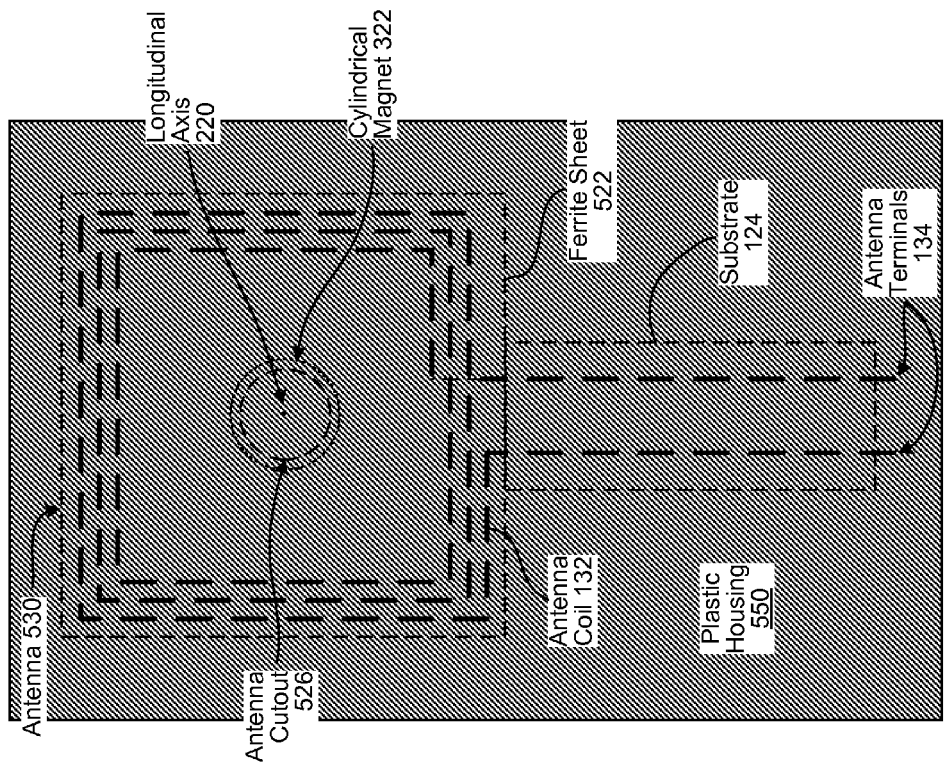
FIG. 5A illustrates a plan view for the magnetically boosted loop antenna arranged in a second non-conductive housing.

This is further demonstrated in FIGS. 5A and 5B, where the section of the plastic housing 550 has no opening proximate to the longitudinal axis. This arrangement may be used, for example, with a stand-alone magnet, the magnet of a haptic effect generator, or if utilizing the backside of a moving coil speaker (with the opening for sound output being located on an opposite side of the device).

Figure 7:
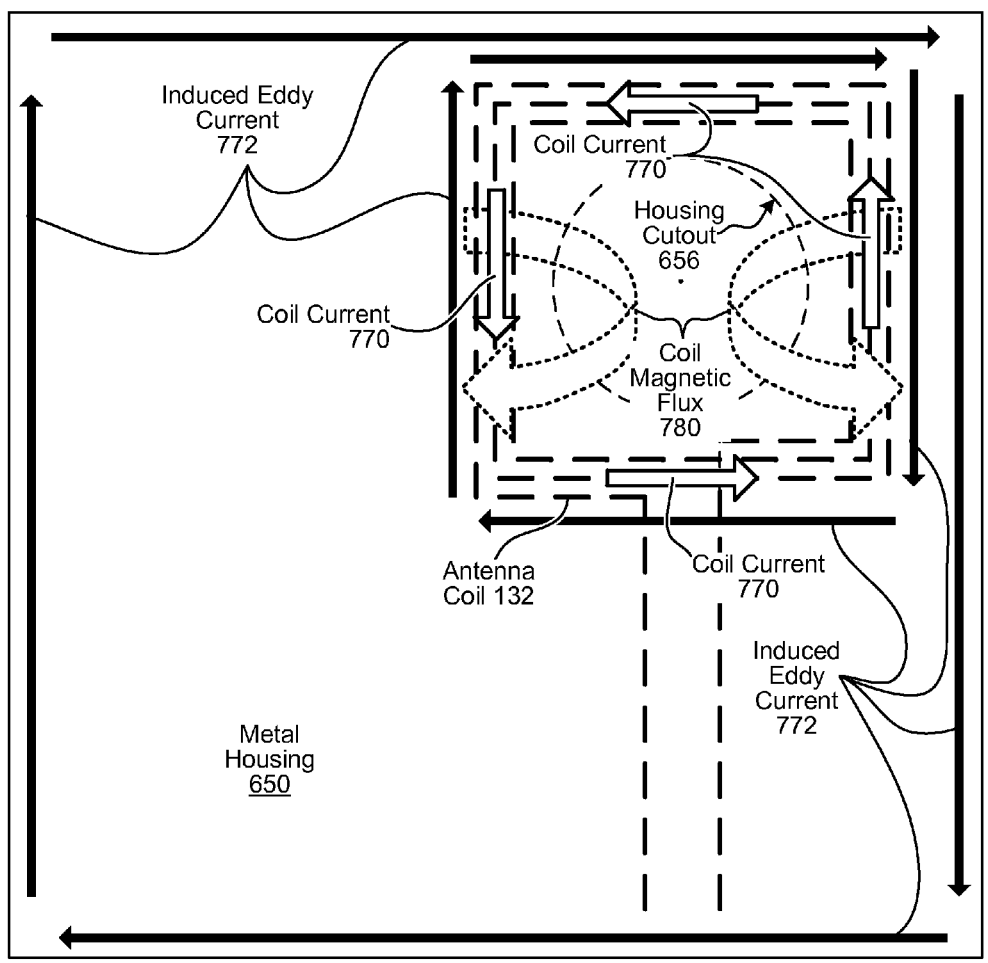
FIGS. 7 and 8 illustrate the interaction of magnetic flux from the antenna coil with a conductive housing from FIG. 6.
Figure 8:
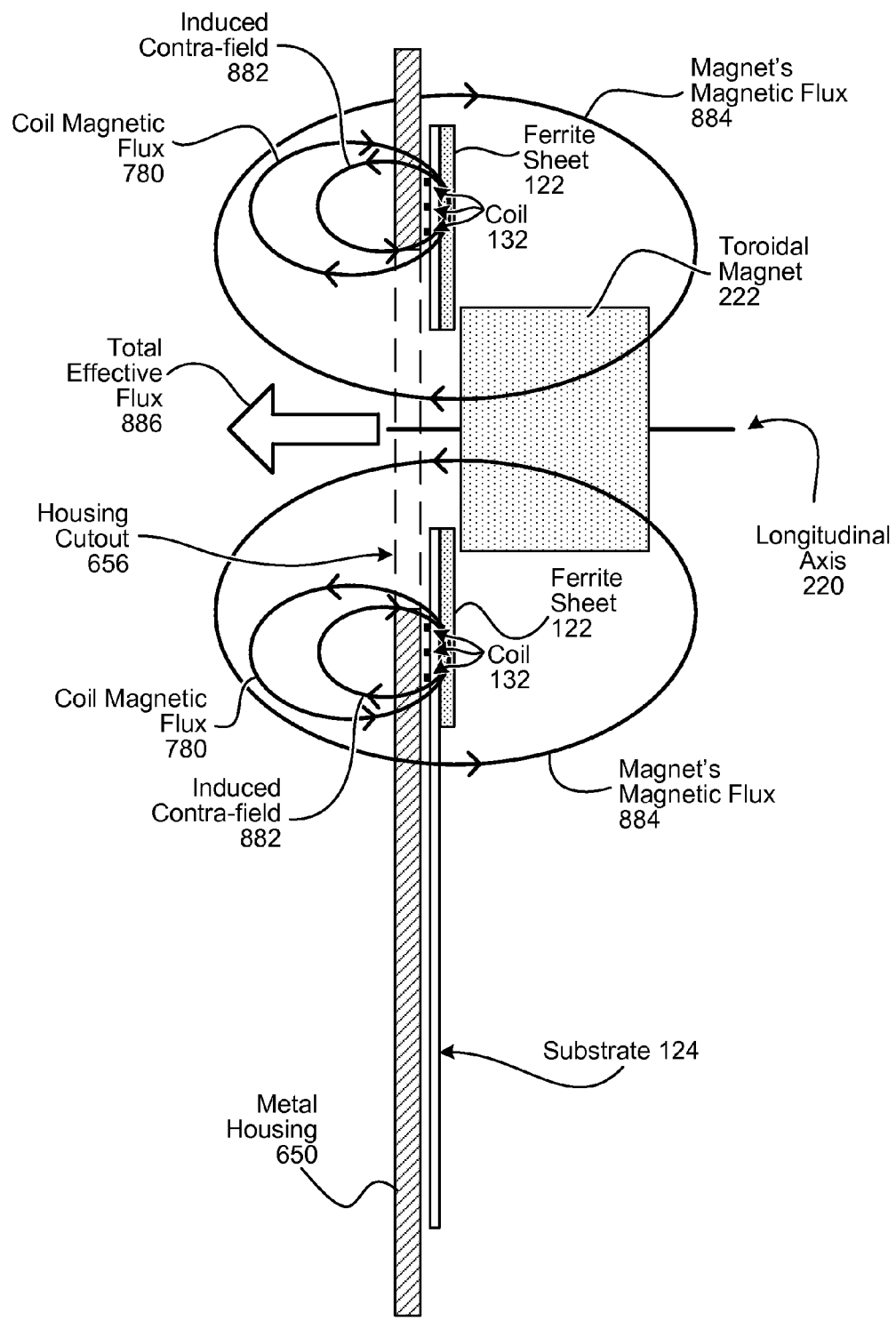

FIGS. 6A and 6B illustrate the antenna 130 and the magnet 222 arranged in an electrically conductive housing (metal housing 650). The modulated magnetic field generated by the antenna coil 132 creates eddy currents in the metal housing 650 which counter the NFC field and reduce performance. FIGS. 7 and 8 illustrates the interactions of magnetic field of the coil 132 with the induced eddy currents 772 in the metal housing 650. The eddy currents 772 are induced in the metal housing 650 by electromagnetic coupling with the coil's signal-modulated magnetic field. The eddy currents 772 flow in an opposite direction to the coil current 770. The coil magnetic flux 780 (illustrated in FIG. 7 by the dotted arrows) represent the direction and magnitude of the coil's modulated magnetic field in the absence of the induced eddy currents 772, as would occur with an electrically non-conductive housing (e.g., plastic housing 450, 550).

However, although the magnetic field 884 of the permanent magnet 222 will advantageously boost the total effective flux 886 extending outward along the longitudinal axis, the coil's magnetic flux 780 is attenuated by an opposing magnetic field 882 caused by the eddy currents 772. Having a housing cutout 656 with a periphery that is equal to or larger than the antenna cutout 126 through the ferrite sheet 122 improves performance in comparison to an electrically conductive housing without a cutout, as the contra-field 882 of the eddy currents 772 is weaker within the cutout 656 (since induced currents do not flow within the area of the cutout). Thus, the combined magnetic flux of the permanent magnet 884 and the coil 780, minus the eddy current's contra-field 882, is "pushed" out though the cutout 656.

The housing 950 in FIGS. 9A and 9B improves on the performance of the arrangement illustrated in FIGS. 6A and 6B. The housing cutout 956 through the metal housing 950 is larger than antenna cutout 126 through the ferrite sheet 122. The cutout is extended to expose a sector/segment of the conductors of the antenna coil 132 and extends over a top of the device (as will be described below in connection with FIG. 12C). As a result, since there is a gap in metal housing on one side of the antenna coil 132, eddy currents that are induced in the metal housing 950 by the antenna 130 cannot complete a circuit around the longitudinal axis and are substantially cancelled out, improving antenna performance. As illustrated, the non-extended sides of the housing cutout 956 do not overlap the magnet 222. The non-extended sides may be coincident with or wider than the antenna cutout 126 through the ferrite sheet 122.

The conductors of NFC antennae are commonly made from patterned metal, such as a metal film, sheet, or foil that is selectively etched to form the coil 132, or metal that is selectively plated, printed, or deposited to form the coil 132. Wire may also be used as the conductors. Examples of metals known in the art for use as the conductors of the antenna coil 132 include copper, silver, aluminum, and palladium. Non-metallic electrical conductors may also be used as the coil 132, such as electrically-conductive polymer conductors.

Figure 11:
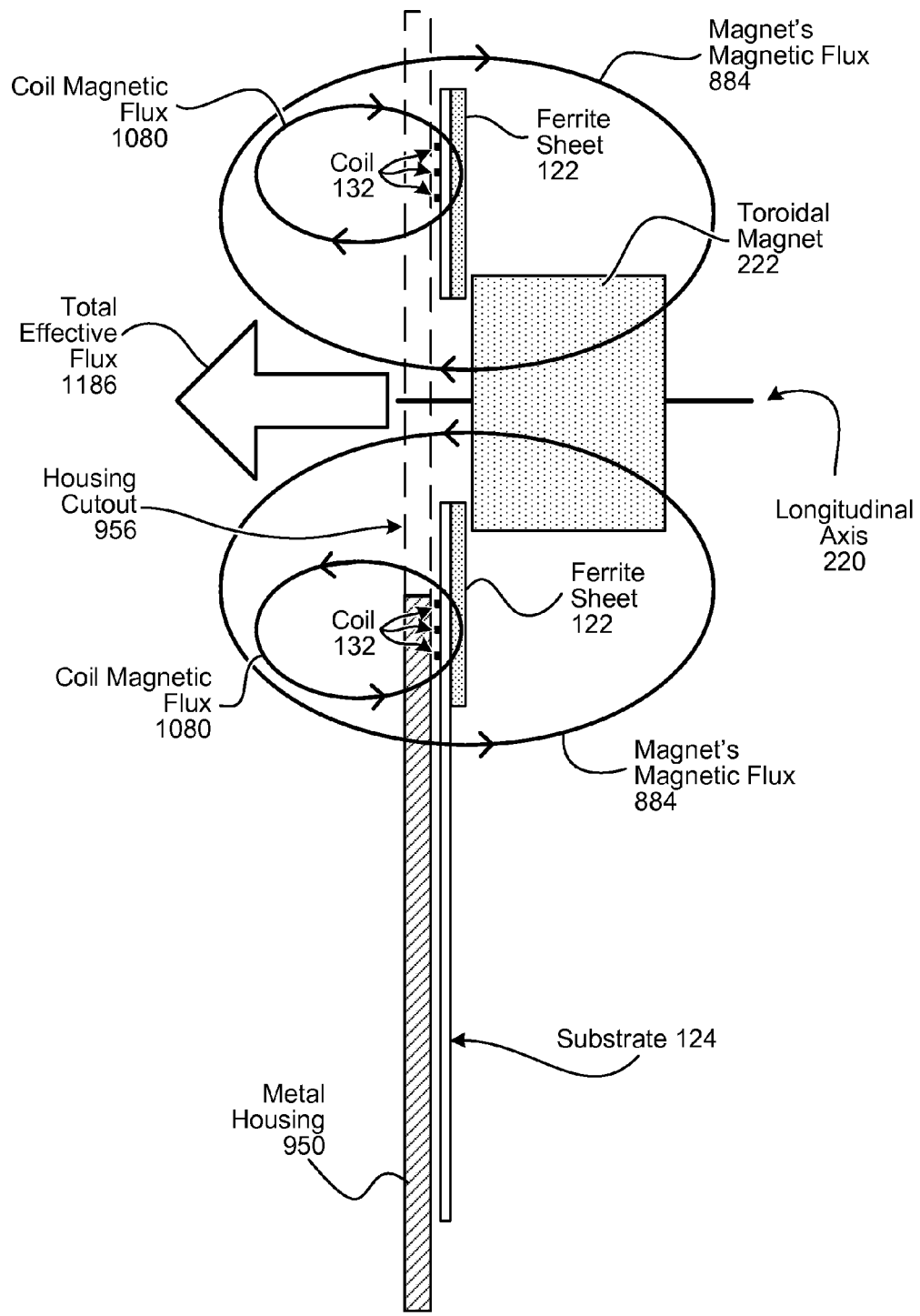

FIGS. 10 and 11 illustrate the induced eddy currents 1072 in the metal housing 950. The magnetic flux 1080 of the coil current 770 induces eddy currents in the metal housing 950, but the eddy currents 1072 must transit around the housing cutout 956 to complete a circuit. This alteration of the current path results in both eddy currents 1072 and coil currents 770 travelling in same direction proximate to the housing cutout 956. As a result, the induced contra-field proximate to the coil 132 is essentially nullified, with flux from opposing eddy currents cancelling each other, and with the coil magnetic flux 1080 and magnet's magnetic flux 884 combining to produce an enhanced total effective flux 1186.

The shape of the magnet's magnetic flux 884 is determined in part by the presence of the ferrite sheet 122, as the magnet's field wraps around the ferrite sheet as a result of the sheet's ferromagnetic properties. Also, based on the directions of the field/flux lines, the magnet 222 is oriented with its north pole proximate to the ferrite sheet 122 and its south pole at the opposite end. If instead the south pole of the magnet 222 faces the surface of the device, reversing the polarity of the NFC signal applied to the antenna coil 132 would likewise result in the magnet's flux 884 enhancing the coil flux 1080.

FIG. 12A is an example illustrating a section of a device based on the arrangement in FIGS. 9A and 9B. A plastic insert 1228 is inserted into metal housing cutout 956. In this example, the magnet 222 is part of a zoom mechanism of a camera 1211. In addition to the zoom mechanism having the permanent magnet 222, the camera 1211 may include many other components such as an image sensor, one or more lenses, zoom mechanism, etc. The dotted lines in FIG. 12A illustrate the relative position of the antenna 130 and magnet 222 inside the housing 950. FIG. 12B illustrates the device 1200 without the dotted-lines showing the underlying antenna/magnet structures. FIG. 12C illustrates how the housing cutout 956 extends across the top of the device 1200 up to a display 1218, such that there is no conductive pathway for induced eddy 1072 across the top of the housing cutout 956.

Figure 13:
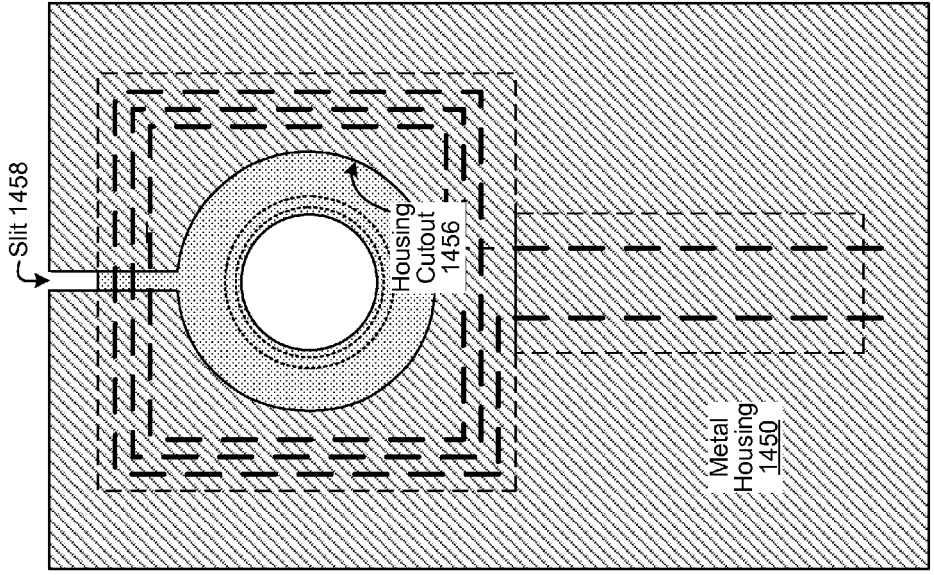
FIGS. 13 and 14 illustrate plan views of alternative conductive housing cutout designs that retain the advantageous flux/field interactions presented in FIGS. 10 and 11.
Figure 14:
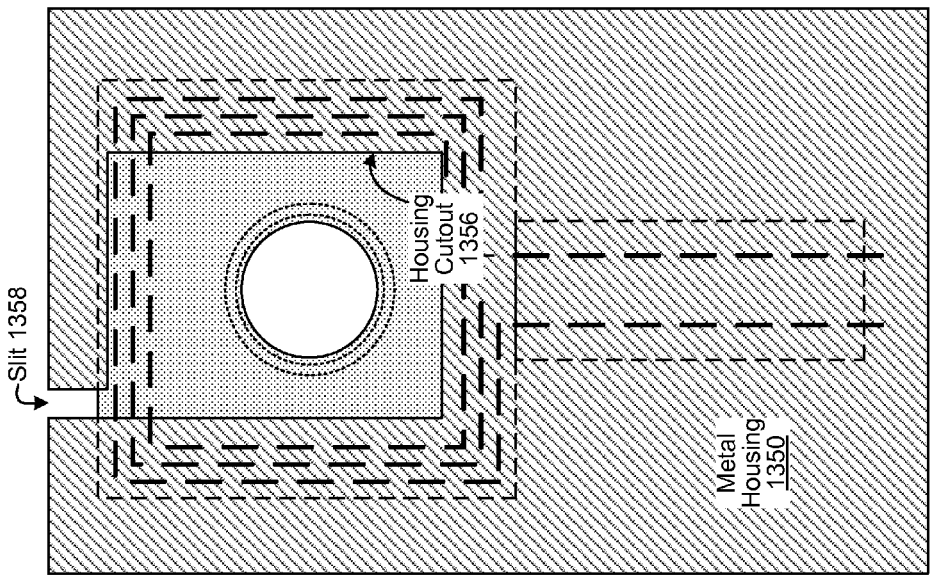

FIGS. 13 and 14 illustrate examples of alternative conductive housing cutouts that retain the advantageous flux/field interactions discussed with FIGS. 10 and 11. A slit 1358, 1458 extends from the housing cutout 1356, 1456 to a front face of the device as in FIG. 12C, cutting off the path by which the induced eddy currents 1072 could circumnavigate the antenna coil 132. As in FIG. 12, a plastic or other electrically non-conductive insert may be inserted into the cutouts 1356, 1456 and/or slits 1358, 1458. The position of the slits in FIGS. 13 and 14 are intended only as examples, and may be repositioned in whatever manner is convenient (e.g., left, right, center, side, etc.), so long as the respective slit breaks the circuit/current path for eddy currents induced in the metal housing 1350, 1450 to circumnavigate the antenna coil 132.

FIGS. 15 and 16 illustrate examples of antenna designs according to other embodiments of the present disclosure and may be used to implement the antenna 130 in FIGS. 1 and 4 to 14. In each of the antennae, the loops of electrical conductor forming the antenna coil are be arranged as a planar (two-dimensional) spiral, such as a curved spiral (e.g., coil 1532) or a straight-line spiral (also known as a spirangle), such as a four-angle square or rectangular spiral (e.g., coil 132). Antenna 1530 in FIG. 15 has a curved spiral antenna coil 1532 instead of a square one. Whatever the shape of the antenna coil, by positioning the center point of the coil to generally coincide with the longitudinal axis of the magnet, performance of the antenna may be enhanced. Similarly, antenna 1630 in FIG. 16 demonstrates that the shape of the cutout through the ferrite sheet may also vary, as ferrite sheet 1622 has a square cutout 1626. Other spiral shapes may be used, such as a six-angle hexagonal straight-line spiral.

As noted above, the style of magnets 222, 322 are interchangeable, and may be positioned through or behind the hole 126/526/1626 in the ferrite sheet 122/522/1622. The longitudinal axis of the magnet may be collocated with a magnetic center of the antenna coil 132/1532. Permanent magnets with shapes other than cylinders and toroids may also be used (the magnet's poles oriented along the longitudinal axis).

A purpose of the ferrite sheet 122/522/1622 is to prevent attenuation of the generated magnetic field due to interactions with other components within the device. Instead of ferrite, other flux-field directional materials may be used, such as other ferromagnetic materials.

Although plastic is illustrated as the material for housings 450, 550 and insert 1228, any electrically non-conductive, magnetically transparent material that will not substantially attenuate the magnetic fields may be used such as glass, carbon fiber, or other electrically non-conductive materials.

As illustrated, antenna coils 132 and 1532 have three loops of the conductor. A different number loops may be used, and three was illustrated merely for demonstration. Without regard to the number of loops, and in addition to the advantage gained by breaking the circuit path of the induced eddy currents discussed in connection with FIGS. 9A to 14, having a housing cutout that exposes all of the conductors on at least one side of the loop, such as housing cutouts 956 and 1358, further reduces a magnitude of the eddy counter currents (e.g., if the coil has four loops, exposing all four conductors on at least one side antenna may reduce parasitic eddy currents in the metal housing). However, as can be understood from the discussions of FIGS. 6A and 14, at least a partial improvement in performance may be obtained even if some of the loops are covered by the metal housing.

Although the antenna design has been discussed in the context of NFC, antennae that may benefit from magnetic boosting include any active (powered) antenna that generates its own magnetic field. Examples include antennae used by Radio-Frequency Identification (RFID) tag readers/interrogators to inductively power RFID tags and active FeliCa antennae (used primarily with smart cards).

Figure 17:
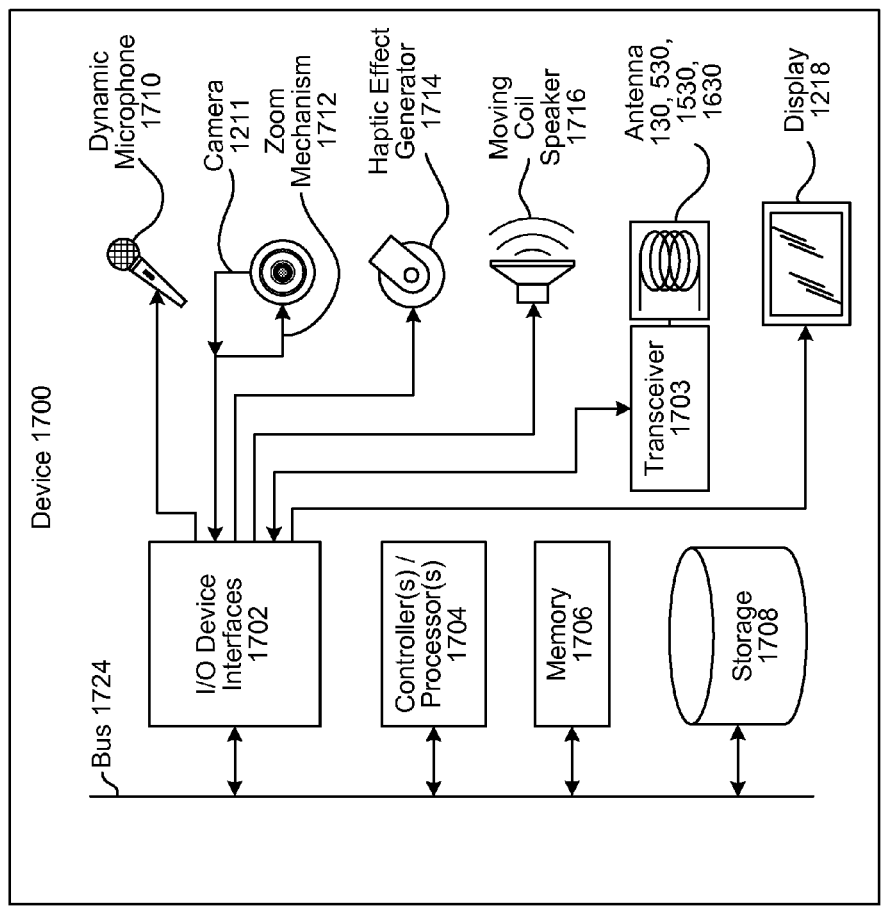
FIG. 17 is a block diagram conceptually illustrating example components of a device including the magnetically boosted antenna.

FIG. 17 is a block diagram conceptually illustrating example components of a device 1700 including a magnetically-boosted inductive antenna 130, 530, 1530, 1630, enclosed in one of the disclosed electrically non-conductive or conductive housings. The device 1200 in FIGS. 12B and 12C is an example of the device 1700, and includes the metal housing 950, the camera 1211, and the display 1218, as well as some or all of the other components described in connection with device 1700. In operation, the device 1700 may include computer-readable and computer-executable instructions that reside on the device 1700, as will be discussed further below.

The device 1700 includes input/output device interfaces 1702. A variety of components may be connected through the input/output device interfaces 1702, such as a dynamic microphone 1710, a camera 1211 including a zoom mechanism 1712 and a lens exposed to the exterior of the device 1700, a coil-based haptic effect generator 1714, a moving coil speaker 1716 and a display 1218. The components 1710, 1211, 1714, and 1716 were selected as examples by virtue of including a magnet that can be aligned with inductive antenna 130, 530, 1530, 1630 to shape and boost the magnetic field emanating from the antenna. The antenna 130, 530, 1530, 1630 is also connected through the input/output device interfaces 1702. Other components may be included, and illustrated components may be omitted.

The device 1700 may include an address/data bus 1724 for conveying data among components of the device 1700. Each component within the device 1700 may also be directly connected to other components in addition to (or instead of) being connected to other components across the bus 1724.

The device 1700 may include one or more controllers/processors 1704, that may each include a central processing unit (CPU) for processing data and computer-readable instructions, and a memory 1706 for storing data and instructions. The memory 1706 may include volatile random access memory (RAM), non-volatile read only memory (ROM), non-volatile magnetoresistive (MRAM) and/or other types of memory. The device 1700 may also include a data storage component 1708, for storing data and controller/processor-executable instructions, such as instructions for software applications that utilize/control the microphone 1710, camera 1211, haptic effect generator 1714, and/or speaker 1716, and software instructions to manage near-field communications though antenna 130, 530, 1530, 1630.

The I/O device interfaces 1702 connects to a communication interface (e.g., transceiver 1703) which applies a modulated signal across the antenna terminals 134 to generate a modulated magnetic field. The communication interface encodes (transmission) and decodes (reception) the data conveyed by the modulations. The communication interface may operate in accordance with a communication protocol (e.g., in accordance with NFC standards such as International Organization for Standardization (ISO)/International Electrotechnical Commission IEC) standards 18092 and/or 21481, and or European Computer Manufacturers Association (ECMA) standards 340 and/or 352).

Figure 18:
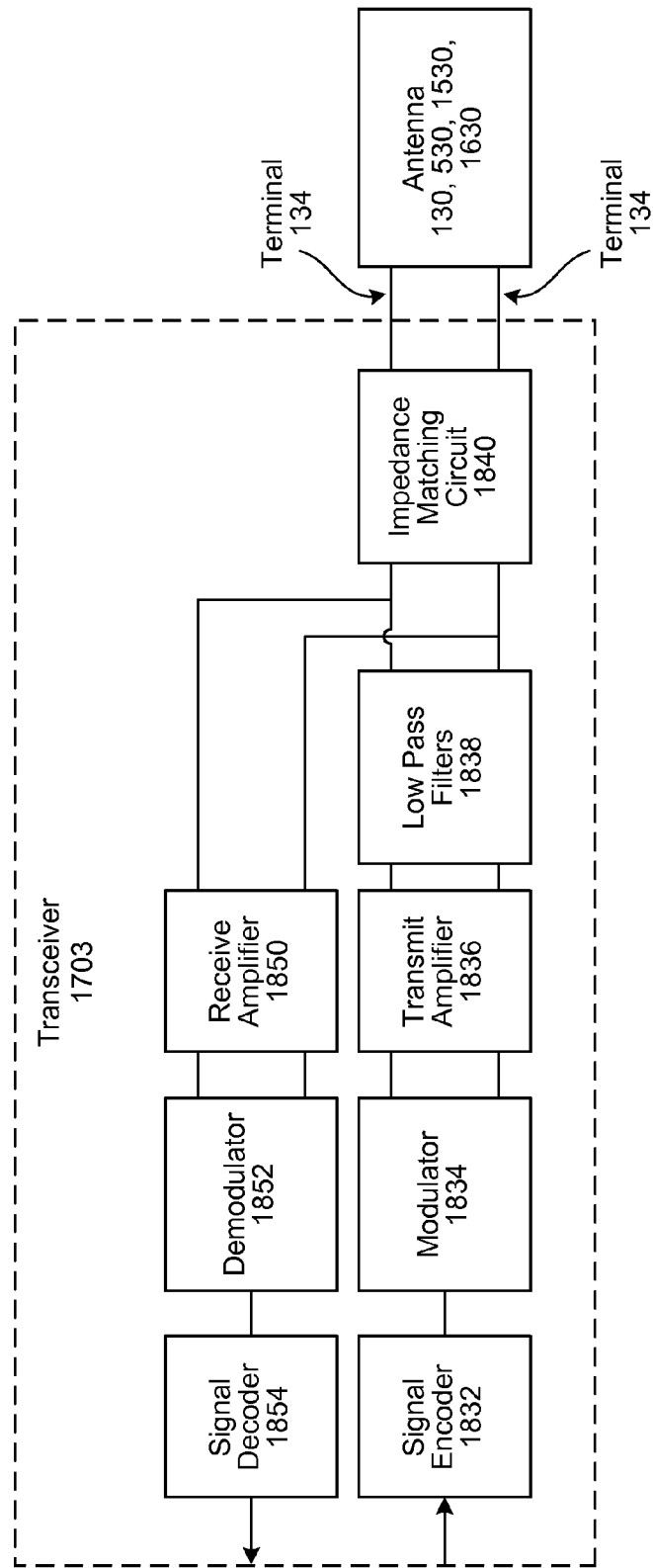
FIG. 18 is a schematic block diagram illustrating an example communication interface coupled to the magnetically boosted antenna.

FIG. 18 illustrates a schematic block diagram of several components commonly found in NFC communication interface circuits. The signal encoder 1832 receives a digital data to be transmitted by magnetic induction via the I/O device interfaces 1702. The signal encoder 1832 applies a modified Miller coding and/or Manchester coding to the digital data in accordance with the NFC standards. Whether Miller or Manchester coding is applied may depend in part upon the data transfer rate.

The encoded output by the signal encoder 1832 is then modulated onto a radio frequency (RF) carrier signal of 13.56 MHz by modulator 1834 using amplitude shift keying (ASK). ASK is a form of amplitude modulation that represents digital data as variations in the amplitude of the carrier wave. In an ASK system, the binary symbol "1" is represented by transmitting a fixed-amplitude carrier wave and fixed frequency for a bit duration of T seconds. If the signal value is "1" then the carrier signal will be transmitted; otherwise, a signal value of "0" will not be transmitted.

The output of the modulator 1834, as well as the connections between many of the components of the transceiver 1703, are illustrated with pairs of connections between components to represent the use of differential signaling. Differential signals may be transmitted over balanced connections with the pair of connections each carrying a signal of opposite polarity to the other.

The carrier-modulated output from the modulator 1834 is amplified by a transmit amplifier 1836, passed through low pass filters 1838 and impedance matching circuit 1840, and applied to the terminals 134 of the antenna 130/530/1530/1630. The low pass filters 1838 pass the modulated 13.56 MHz radio frequency (RF) carrier signal, but reduce carrier harmonics. The impedance matching circuit 1840 improves power transfer by matching an impedance of the antenna to a complex conjugate of the impedance of the transmit amplifier 1836 (with the inline low-pass filters 1838) and the impedance of a receive amplifier 1850, as is known in the art. Application of the modulated 13.56 MHz carrier to the antenna coil 132/1532 causes the coil to produce a corresponding magnetic field (e.g., 780, 1080).

If the device 1700 is also used to receive signals by magnetic induction, a receive amplifier 1850 amplifies an electrical signal induced in the antenna coil 132/1532 by an applied magnetic field. The carrier demodulator 1852 then extracts encoded signal from the ASK modulated RF carrier. The signal decoder 1854 converts the encoded signal into a digital signal, which is output to the I/O device interfaces 1702.

While the transceiver 1703 is described using the carrier frequency and modulation schemes commonly employed with NFC, a communication interface circuit configured for other magnetic induction communication protocols such as FeliCa may be used.

Returning to FIG. 17. the data storage component 1708 may include one or more non-volatile storage types such as magnetic storage, optical storage, solid-state storage, etc. The device 1700 may also be connected to removable or external non-volatile memory and/or storage (such as a removable memory card, memory key drive, networked storage, etc.) through the input/output device interfaces 1702.

Computer instructions for operating the device 1700 and its various components may be executed by the controller(s)/processor(s) 1704, using the memory 1706 as temporary "working" storage at runtime. The computer instructions may be stored in a non-transitory manner in non-volatile memory 1706, storage 1708, or an external device. Alternatively, some or all of the executable instructions to utilize the components 1211, 1710 to 1716, display 1218, and antenna 130, 530, 1530, 1630 may be embedded in hardware or firmware in addition to or instead of software.

Protocols such as NFC may support both active and passive communications. In passive communications, an initiator device provides a carrier field and the target device answers by modulating the existing field. The target device may draw its operating power from the initiator-provided electromagnetic field. In active communications, both the initiator and the target device communicate by alternately generating their own fields (peer-to-peer). A device deactivates its RF field while it is waiting for data, and both devices are typically powered. The advantages of magnetically boosting inductive communications disclosed herein relate to devices that generate their own fields (e.g., the initiator in a passive system, and both the initiator and target in an active system).

The concepts disclosed herein may be applied within a number of different electronic devices and systems, including, NFC/RFID/FeliCa point-of-sale readers/interrogators, and personal electronic devices supporting NFC transactions such as smart phones, tablet computers, and other mobile devices.

The above examples are meant to be illustrative. They were chosen to explain the principles and application of the magnetically-boosting inductive antennae and are not intended to be exhaustive or to limit the disclosure. Many modifications and variations of the disclosed aspects may be apparent to those of skill in the art. Persons having ordinary skill in the field of near field communication and inductive coupling should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

As used in this disclosure, the term "a" or "one" may include one or more items unless specifically stated otherwise. Further, the phrase "based on" is intended to mean "based at least in part on" unless specifically stated otherwise.

What is claimed is:

1. A device configured for Near Field Communication (NFC) using magnetic field induction, comprising:
    a housing having an inner surface and an outer surface;
    a coil comprising an electrically conductive material arranged as a planar spiral, the coil located within the housing, adjacent to the inner surface of the housing, wherein a center of the planar spiral is located substantially along a first axis;
    a ferrite sheet, the coil disposed between the ferrite sheet and the inner surface of the housing, the ferrite sheet having a first opening there-through, wherein a center of the first opening is located substantially along the first axis;
    a communication circuit coupled to the coil, the communication circuit to apply a modulated electrical signal to the coil to cause the coil to generate a magnetic field to communicate data included in the modulated electrical signal by magnetic induction; and
    a camera having a lens exposed to the exterior of the housing, the camera further including a zoom mechanism that comprises a toroidal permanent magnet, wherein an end of the toroidal permanent magnet is proximate to the first opening through the ferrite sheet, the first opening being smaller than a perimeter of the end of the toroidal permanent magnet, the ferrite sheet overlapping at least the perimeter of the end, and a longitudinal axis of the toroidal permanent magnet being substantially collocated with the first axis.

2. The device of claim 1, wherein the housing comprises a metal portion, the metal portion covering at least a portion of the coil and having a second opening there-through, the longitudinal axis of the magnet oriented to pass through the second opening.

3. The device of claim 2, wherein the second opening in the metal portion of the housing is arranged so that the metal portion does not overlap a portion of the coil.

4. A device comprising:
    an antenna comprising a coil and a ferrite sheet, the coil comprising an electrically conductive material and the ferrite sheet arranged adjacent to the coil, a first opening through the ferrite sheet being substantially along a same axis as a center of the coil; and
    a permanent magnet proximate to the first opening through the ferrite sheet, a longitudinal axis of the magnet being substantially collocated with the same axis.

5. The device of claim 4, wherein a first magnetic field of the permanent magnet interacts with a second magnetic field of the antenna to boost a communication range of the device when an electrical signal encoded with data is applied to the coil, the electrical signal to cause the coil to generate the second magnetic field to communicate the data.

6. The device of claim 4, wherein:
    the ferrite sheet overlaps a portion of a proximate end of the permanent magnet, and
    the permanent magnet and the coil are on opposite sides of the ferrite sheet.

7. The device of claim 4, further comprising a housing having an inner surface and an outer surface, the coil being adjacent to the inner surface of the housing and disposed between the inner surface of the housing and the ferrite sheet.

8. The device of claim 7, wherein:
    the housing comprises a metal portion that overlaps at least a first part of the coil, the metal portion including a second opening that is proximate to the longitudinal axis of the permanent magnet, and
    the second opening is arranged such that the metal portion does not overlap a second part of the coil.

9. The device of claim 8, wherein the second opening is arranged so that there is at least a gap in the metal portion so that the metal portion does not circumnavigate the coil.

10. The device of claim 4, wherein the permanent magnet is part of an electronic component, the electronic component being a microphone, a camera zoom mechanism, a haptic effect generator, or a speaker.

11. The device of claim 4, further comprising a communication circuit connected to the coil, the communication circuit configured to apply a modulated electrical signal to the coil to cause the coil to generate a magnetic field to communicate data included in the modulated electrical signal by magnetic induction.

12. The device of claim 11, wherein the communication circuit supports a Near Field Communication (NFC) protocol.

13. The device of claim 11, wherein the communication circuit comprises a signal encoder, a modulator, an amplifier, and an impedance matching circuit.

14. The device of claim 13, wherein the communication circuit supports a Near Field Communication (NFC) protocol, the signal encoder configured to encode a digital baseband signal using a Miller coding or a Manchester coding, and the modulator configured to modulate a radio frequency carrier based on the encoded signal using amplitude shift keying.

15. A device configured to communicate data by magnetic induction comprising:
  an antenna comprising an electrical conductor arranged as a coil and a sheet of ferrite material arranged adjacent to the coil, a first opening through the sheet being substantially along a same axis as a center of the coil;
  a permanent magnet proximate to the antenna, a longitudinal axis of the magnet being located substantially collocated with the same axis;
  a communication circuit connected to the coil, the communication circuit configured to apply a modulated electrical signal to the coil to cause the coil to generate a magnetic field to communicate data included in the modulated electrical signal by magnetic induction; and
  a housing including at least the antenna, the permanent magnet, and the communication circuit, the antenna being disposed adjacent to an inner surface of the housing.

16. The device of claim 15, wherein the ferrite sheet overlaps a proximate end of the permanent magnet.

17. The device of claim 15, wherein:
  the housing comprises a metal portion that overlaps at least a first part of coil, the housing including a second opening that is proximate to the longitudinal axis of the permanent magnet; and
  the second opening is arranged such that the metal portion does not overlap a second part of the coil.

18. The device of claim 17, wherein the second opening is arranged so that there is at least a gap in the metal portion so that the metal portion does not circumnavigate the coil.

19. The device of claim 15, wherein the permanent magnet is part of an electronic component, the electronic component being a microphone, a camera zoom mechanism, a haptic effect generator, or a speaker.

20. The device of claim 15, wherein:
  the communication circuit comprises a signal encoder, a modulator, an amplifier, and an impedance matching circuit, and
  the signal encoder and the modulator are configured for Near Field Communication (NFC) communications.

* * * * *